May 15, 1923.
C. G. SAVELL
EMERGENCY BRAKE
Filed May 9, 1921
1,455,666
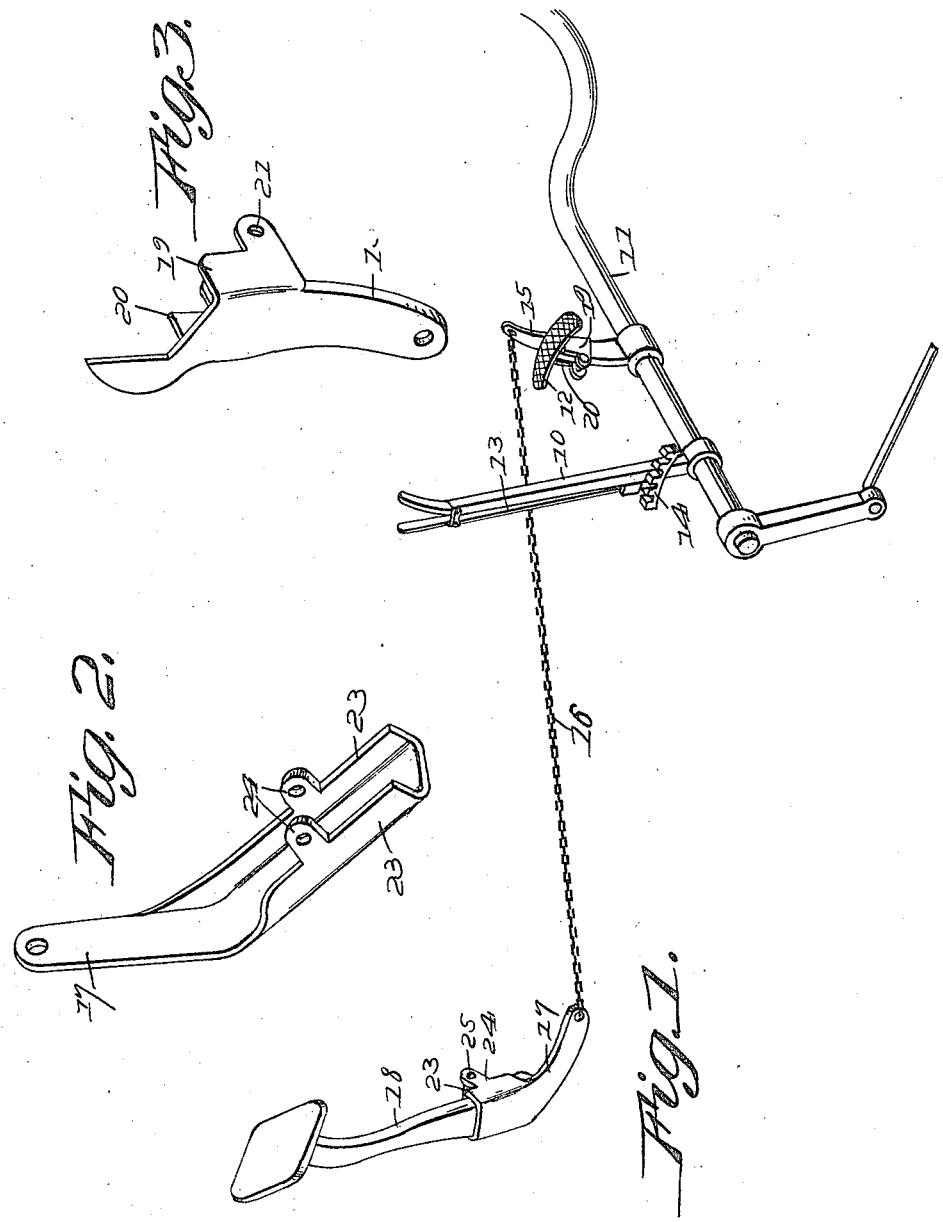

Patented May 15, 1923.

UNITED STATES PATENT OFFICE.

CROSS G. SAVELL, OF SILVER CITY, MISSISSIPPI.

EMERGENCY BRAKE.

Application filed May 9, 1921. Serial No. 468,121.

*To all whom it may concern:*

Be it known that I, CROSS G. SAVELL, a citizen of the United States of America, residing at Silver City, in the county of Humphreys and State of Mississippi, have invented new and useful Improvements in Emergency Brakes, of which the following is a specification.

The object of the invention is to provide an emergency brake for automobiles of the Ford and similar types adapted to be applied through the medium of the controller shaft to avoid the necessity of using a special emergency band brake on one of the driving wheel hubs as in the ordinary practice, and yet obtain the advantages which are incident to the use of an emergency means for checking the forward movement of a vehicle of this type; and with this object in view the invention consists in a construction and combination of parts of which a preferred embodiment is shown in the accompanying drawings, wherein:—

Figure 1 is a perspective view of an emergency brake mechanism embodying the invention.

Figures 2 and 3 are detail views of the attachment provided for application respectively to the clutch and controller pedals.

The apparatus consists essentially of a hand lever 10 applied directly to the controller shaft 11 which ordinarily carries the controller pedal 12, said hand lever being provided with a latch mechanism 13 for cooperation with a toothed segment 14 to provide for locking the same in an adjusted position, and means for connecting the controller shaft with the clutch pedal so that when the controller shaft is rocked by means of the hand lever to apply the brakes the clutch lever is thrown to neutral or clutch disengaging position and is so held permanently by the locking of the emergency brake lever.

In the construction illustrated an arm 15 is clamped to the shank or stem of the cam plate 12 and is connected by a cable or wire or chain 16 or the equivalent thereof to an arm 17 which is clamped to the clutch pedal shank shown at 18 to the end that when the hand lever is moved in the direction to apply the brakes the clutch pedal 18 moves in the reversed direction thereto.

In practice it is preferred to form these attachable arms 15 and 17 of plate metal adapted to be struck and formed on a die, the arm 15 having the side ears 19 and 20 provided with registering openings 21 for the reception of a transverse bolt, and the arm 17 having parallel side webs 23 provided with perforated ears 24 for connection by a transverse bolt 25.

The construction of the arms as indicated provides for the attachment thereof with facility to the stems respectively of the clutch pedal and cam plate, whereupon the only further adjustment necessary is the attachment of the flexible connection 16 whereby a proper movement of said pedal may be effected when the controller shaft is moved or rocked by means of the manually actuable brake lever. It will be understood that the said connection may be adjusted to secure a proper tension and to take up any slack or looseness which would tend to interfere with a proper cooperative action as described.

Having described the invention, what is claimed as new and useful is:—

An emergency brake mechanism for cars of the type indicated having a manually actuable brake lever and controller shaft to which said lever is attached, and a cam plate provided with a shank connected with said shaft, a pair of arms attached respectively to the cam plate shank and to the clutch pedal shank, and a flexible connection between said arms and consisting of a chain terminally secured to the extremities of the arms, the arms being struck from plate metal and provided with side ears having registering openings for the reception of a transverse bolt, the side ears embracing the shanks respectively of the clutch pedal and the cam plate.

In testimony whereof he affixes his signature.

CROSS G. SAVELL.